July 17, 1962 R. A. MUNSE 3,044,165
METHOD OF MAKING SCREW-RECEIVING FASTENERS OR THE LIKE
Filed May 16, 1960
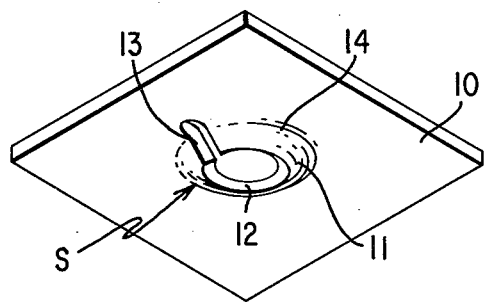
Fig. 1
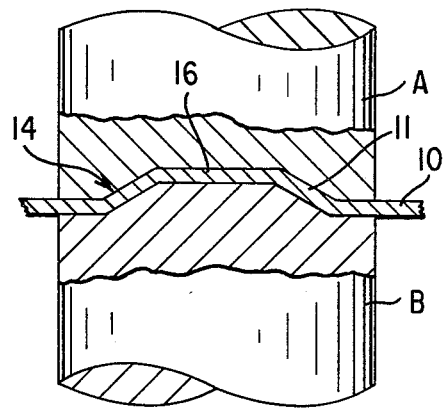
Fig. 2
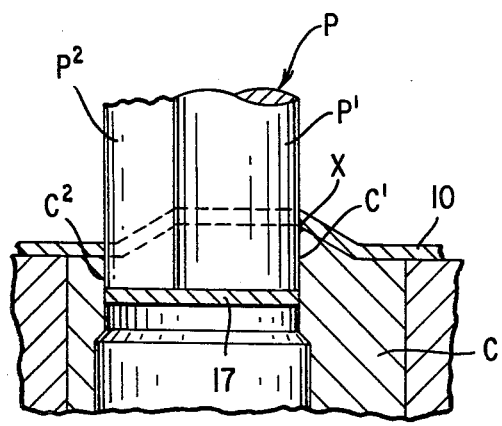
Fig. 3
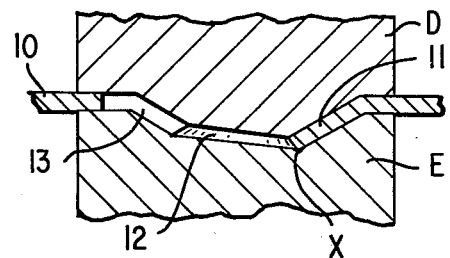
Fig. 4
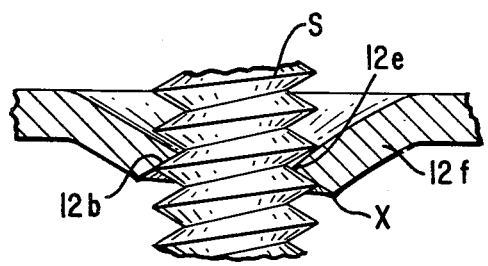
Fig. 5
Fig. 6
INVENTOR.
ROBERT A. MUNSE
BY Malcolm W. Fraser
ATTORNEY United States Patent Office 3,044,165
Patented July 17, 1962

3,044,165
METHOD OF MAKING SCREW-RECEIVING FASTENERS OR THE LIKE
Robert A. Munse, Perrysburg, Ohio, assignor to Prestole Corporation, Toledo, Ohio, a corporation of Michigan
Filed May 16, 1960, Ser. No. 29,190
1 Claim. (Cl. 29—532)

This invention relates to sheet metal fasteners but more particularly to screw-receiving fasteners stamped from sheet metal.

In my copending application Serial No. 853,297, filed November 16, 1959, and entitled "Sheet Metal Fastener and Method of Making Same," I described a method in which the sheet metal was pressed out of its plane into the general form of the finished fastener and then the form was inverted. In other words, the fastener form was pressed from one side of the sheet metal panel to the opposite side. This achieved certain beneficial results but one source of trouble was experienced. In punching the hole in the fastener, a burr was not infrequently caused by the punch and such burred edge was troublesome, when engaged by a screw, because of damage it caused an interference with the normal action of the screw.

An object of this invention is to overcome the above difficulty and produce a method of forming a screw-receiving fastener from sheet metal, the screw-engaging edge of which is free of burrs or unduly roughened edges which are troublesome and objectionable.

Another object is to produce a new and improved method of forming a sheet metal screw-engaging fastener, which lends itself admirably to large scale production and which is instrumental in producing a fastener, with which a screw more efficiently engages and which has the advantageous features hereinafter described.

Other objects and advantages of the invention will hereinafter appear, and for purposes of illustration but not of limitation, an embodiment of the invention is shown on the accompanying drawings, in which FIGURE 1 is a perspective view of the completed sheet metal fastener adapted for reception of a screw;

FIGURE 2 is a fragmentary sectional view showing the first step pursued in the formation of the fastener in which an imperforate dimple or cone is formed;

FIGURE 3 is a fragmentary sectional view showing the next step pursued in forming the fastener, and showing the punch operating to cut out a slug from the sheet metal which constitutes the hole through the fastener and the radial slot at one side;

FIGURE 4 is a fragmentary sectional view showing the next succeeding step in the formation of the fastener in which the fastener is inverted or the metal pressed from the upper side to the lower side of the sheet metal panel;

FIGURE 5 is a fragmentary sectional view of the completed fastener and showing by broken lines the position of the cone or protuberance before the final inversion step which is shown by full lines; and FIGURE 6 is a fragmentary sectional view of the completed fastener and showing the manner in which the edge portion of the hole in the fastener engages the threads of the screw.

Referring to the drawings, FIGURE 1 shows the completed fastener for screw reception and is generally indicated at S, it being formed from a flat sheet metal panel 10 and consists of a cone-like protuberance 11 which has a central screw-receiving hole 12, the edge portion of which is in the form of a helix, there being a radial slot 13, one side of which is higher than the other in order to achieve the desired helix.

The screw-receiving impression S as depicted on FIGURE 1 is produced from dies and as shown in FIGURE 2, upper and lower die members A and B respectively are illustrated. Between these die members is placed the flat sheet of metal and when the dies are brought together a protuberance or dimple 14 is formed in the sheet metal panel 10 with upwardly and inwardly flared side walls 11 forming substantially an imperforate frusto-conical impression with a flat top wall 16.

From the die members A and B, the panel 10 is delivered to a die member C which has a top form conforming to the generally frusto-conical shape, this die member having a round hole C' with a laterally disposed radial slot C². A punch P is employed and is movable downwardly vertically at right angles against the sheet metal piece and this punch has a generally cylindrical portion P', at one side of which is a laterally disposed slot-punching portion P². The punch P is moved downwardly vertically to punch out a slug 17, thereby to form the cylindrical hole in the top wall 16 and at one side thereof the radial slot as indicated at 13 on FIGURE 1. When the punch comes down and excises the slug 17, not infrequently a burr or roughened edge portion is created at the underside of the edge of the hole as indicated at X.

In the next step and as indicated on FIGURE 4 by die members D and E, the metal is inverted or in other words the protuberance is pressed from the upper position shown in FIGURE 3 to a lower position on the opposite side of the panel 10 as indicated in FIGURE 4. As a result, the roughened edge or the edge of the hole 12 having the burr as indicated at X, is on the edge remote from that edge which engages or is engaged by the sheet metal screw. As a consequence the burr formed by a punch P is disposed remote from the portion of the edge of the hole which extends into the threads of the screw as indicated clearly on FIGURE 6.

Reference is now made to FIGURE 5 and in the broken line showing in this figure, it will be observed that before the metal is inverted, the protuberance has a round hole, the walls 12b of which are disposed at 90° to the horizontal or plane of the flat plane 10 and a sharp edge 12c is formed at the juncture of the aperture wall 12b and the outer sloping wall 12f as indicated at 12d, and although this angle may vary, for practical purposes it should be between 50° and 70° for satisfactory screw thread accommodation. When the impression is inverted to the full line position shown on FIGURE 5, the angle 12d remains substantially unchanged and the edge 12e which is transferred from an outer edge as shown by the broken lines to an inner edge as shown by the full lines, forms a substantially sharp edge to enter between the threads of a screw applied thereto. In order to accommodate the pitch of a sheet metal screw S, the edge 12e when inverted is formed into a helix, the slot 13 defining the upper and lower edges of the helix. In other words, the metal at one side of the slot 13 is bent outwardly from the plane of the flat surface of the panel 10 on a radius of gyration greater than that of the metal on the other side of the slot. The base 14 (FIGURE 1) of the impression or protuberance represents a one-turn spiral and the locus of the axis of gyration of elements of the metal of the impression taken at successive radials around the aperture. Thus the impression is helicoid rather than strictly conical and the dies are designed to form the completed fastener as shown on FIGURE 1.

The importance of the screw-engaging edge 12e of the hole 12 and the angle 12d are depicted on FIGURE 6 from which it will be noted that this edge portion extends well into the root of the screw S. Thus the force of the threads of the screw when it is tightened against the fastener is directed tensilely against the flat wall or face 12b of the edge and thence to the walls 12f in a generally straight line fashion. Manifestly it is important that the edge 12e be as smooth as possible and free from burrs or roughened edges which would interfere with the screwthreading operation and cause galling or damaging results.

It will be understood that a substantial improvement is achieved by the above fastener over similar fasteners in which the edge of the hole was in shear engagement with the threads of the screw and as a result, not infrequently the crests of the threads of the screw were sheared when the parts were sufficiently loaded. A further advantage resides in the fact that this fastener can employ a heavier gauge sheet metal for a particular screw and as a consequence it is not necessary to govern the thickness of the sheet metal for a particular pitch of screw.

Heretofore there was a definite limit of the thickness of the sheet metal for a fastener of this type and the thickness of the sheet metal was ordinarily about one-half the pitch of the screw. To illustrate this difference, heretofore, it was necessary to make a 5/16–18 thread form fastener of .025" thickness of metal for application to a torque of approximately 56 inch pounds while the same thread form can be used in accordance with this invention to afford a torque reading of 180 inch pounds with .059" thickness of metal so that an increase of strength of better than 300% is obtained. Therefore not only can heavier gauge sheet metal be employed in order greatly to increase the strength of the sheet metal fastener for a particular screw, but even with the same gauge of sheet metal as employed with former fasteners of this type, substantially increased strength is assured.

Numerous changes in details and construction of arrangement and operation may be effected without departing from the spirit of the invention, especially as defined in the appended claim.

What I claim is:

The method of forming a screw-receiving impression in sheet metal which consists in pressing a generally frusto-conical protuberance from a sheet metal piece having a flaring side wall and a flat imperforate end wall to provide a generally concavo-convex form, punching out of the imperforate end wall at substantially right angles thereto a round hole and out of the flaring side wall a radial slot, the punching operation taking place from the outer or convex side to the inner side or concave side of the impression so that burrs or roughened edges of the hole edge therefrom are disposed at the inner side thereof, and finally pressing the impression in a reverse direction so that substantially the same form is obtained but with the edges of the hole disposed at an angle of less than 90° to the horizontal and such edge is in helical form, the burr-containing edge being on the inside edge of the hole and away from penetration into the threads of an applied screw.

References Cited in the file of this patent

UNITED STATES PATENTS

| | | |
|---|---|---|
| 2,169,056 | Place | Aug. 8, 1939 |
| 2,383,133 | Kost | Aug. 21, 1945 |